United States Patent
Song et al.

(10) Patent No.: US 8,140,896 B2
(45) Date of Patent: Mar. 20, 2012

(54) SYSTEM AND METHOD FOR DOWNLOADING SYSTEM PROGRAM

(75) Inventors: Myoung-Su Song, Seoul (KR); Jong-In Kim, Yongin-si (KR); Myung-Hoon Jang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 445 days.

(21) Appl. No.: 11/652,554

(22) Filed: Jan. 12, 2007

(65) Prior Publication Data
US 2007/0198703 A1 Aug. 23, 2007

(30) Foreign Application Priority Data
Jan. 14, 2006 (KR) .................. 10-2006-0004177

(51) Int. Cl.
*G06F 11/00* (2006.01)
(52) U.S. Cl. .......................... 714/18; 714/25
(58) Field of Classification Search .............. 714/18
See application file for complete search history.

(56) References Cited

U.S. PATENT DOCUMENTS

| | | | | |
|---|---|---|---|---|
| 5,842,011 | A * | 11/1998 | Basu | 713/2 |
| 6,189,051 | B1 * | 2/2001 | Oh et al. | 717/175 |
| 6,209,089 | B1 * | 3/2001 | Selitrennikoff et al. | 713/2 |
| 6,317,826 | B1 * | 11/2001 | McCall et al. | 713/1 |
| 6,598,095 | B2 * | 7/2003 | Peterson | 710/8 |
| 6,754,725 | B1 * | 6/2004 | Wright et al. | 710/8 |
| 6,810,444 | B2 * | 10/2004 | Kimura | 710/27 |
| 6,868,492 | B1 * | 3/2005 | McCarty et al. | 713/1 |
| 6,883,078 | B2 * | 4/2005 | Chen | 711/165 |
| 7,206,971 | B2 * | 4/2007 | Zeller et al. | 714/36 |
| 7,277,978 | B2 * | 10/2007 | Khatami et al. | 711/103 |
| 7,331,046 | B2 * | 2/2008 | Shida et al. | 717/162 |
| 2002/0073415 | A1 * | 6/2002 | Kim et al. | 717/173 |
| 2003/0069999 | A1 * | 4/2003 | Cheston et al. | 709/316 |
| 2003/0084257 | A1 * | 5/2003 | Mowery et al. | 711/154 |

(Continued)

FOREIGN PATENT DOCUMENTS
JP 07-084776 3/1995

(Continued)

OTHER PUBLICATIONS

James A. Golding, Edward A. Pope and Ronald M. Zuckerman, Mar. 19, 2001, Generic Boot Loader for Initializing a Device Card Attached to a Computer Via an Expansion Bus, p. 1-3.*

(Continued)

*Primary Examiner* — Scott Baderman
*Assistant Examiner* — Kamini Patel
(74) *Attorney, Agent, or Firm* — Harness, Dickey & Pierce, P.L.C.

(57) ABSTRACT

A system and method thereof are provided. The example method may include downloading first information, from a host device, associated with an operation of a non-volatile memory and downloading second information associated with an operation of the system including the non-volatile memory, the second information downloaded based on the operation of the non-volatile memory in accordance with the downloaded first information. The example system may include a host device configured to provide first information associated with an operation of a non-volatile memory and second information associated with an operation of the system, the system including the non-volatile memory, the second information downloaded based on the operation of the non-volatile memory in accordance with the downloaded first information.

21 Claims, 2 Drawing Sheets

U.S. PATENT DOCUMENTS

| | | | |
|---|---|---|---|
| 2005/0015582 A1* | 1/2005 | Shida et al. | 713/2 |
| 2005/0022212 A1* | 1/2005 | Bowen | 719/321 |
| 2006/0135208 A1* | 6/2006 | Lee | 455/558 |
| 2006/0200629 A1* | 9/2006 | Oishi et al. | 711/115 |
| 2008/0133901 A1* | 6/2008 | Nijhawan et al. | 713/2 |

FOREIGN PATENT DOCUMENTS

| | | |
|---|---|---|
| KR | 10-1998-025867 | 7/1998 |
| KR | 1020000002133 A | 1/2000 |
| KR | 1020010038169 A | 5/2001 |
| KR | 10-2002-0094470 | 12/2002 |
| KR | 1020030074106 A | 9/2003 |
| KR | 10-2005-0102098 | 10/2005 |

OTHER PUBLICATIONS

Office Action dated Jan. 23, 2007 for corresponding Korean Application No. 10-006-0004177 and English translation thereof.

Chinese Office Action dated Mar. 29, 2011 issued in corresponding Chinese Application No. 200710001384.9 and English Translation thereof.

* cited by examiner

FIG. 1 (CONVENTION ART)
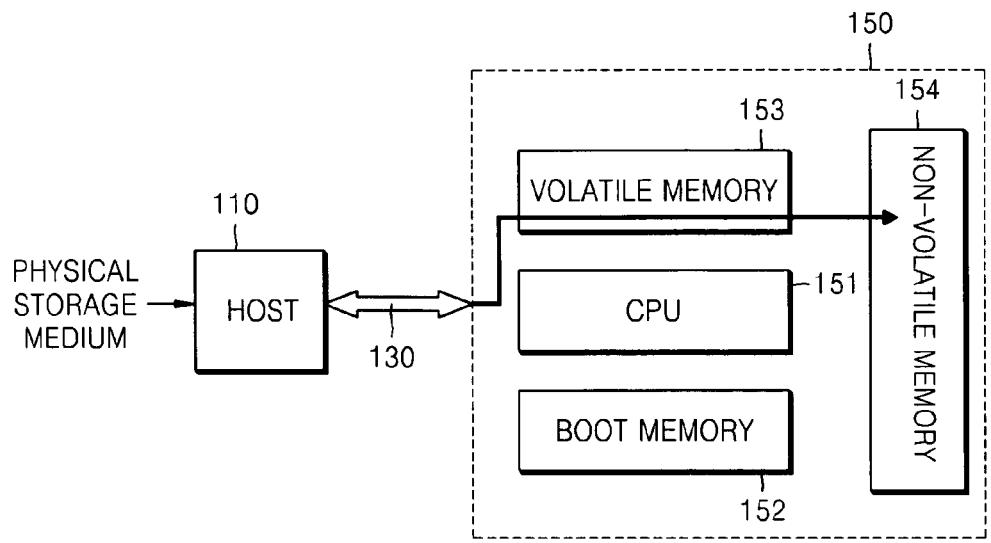
FIG. 2
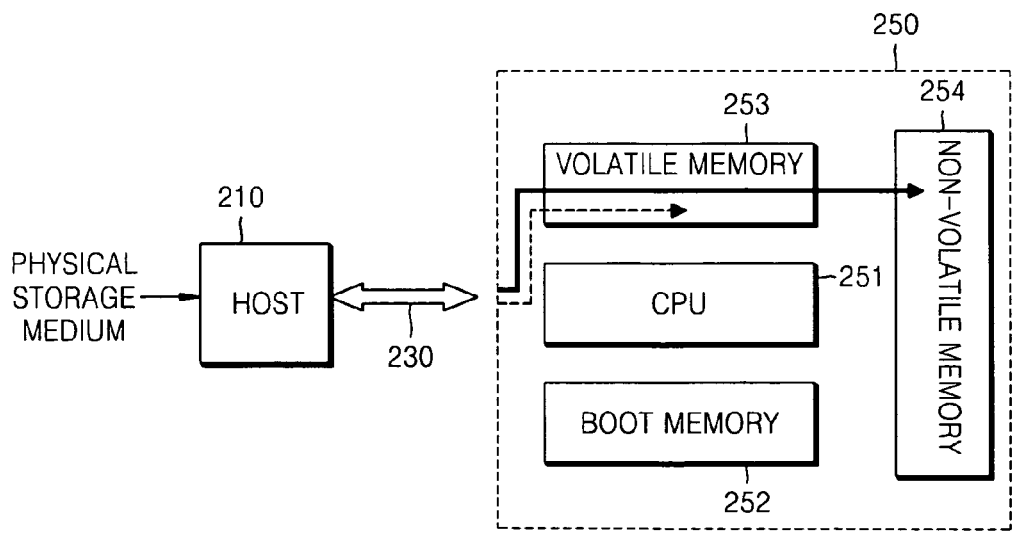

SYSTEM AND METHOD FOR DOWNLOADING SYSTEM PROGRAM

PRIORITY STATEMENT

This application claims the benefit of Korean Patent Application No. 10-2006-0004177, filed on Jan. 14, 2006, in the Korean Intellectual Property Office, the disclosure of which is incorporated herein in its entirety by reference.

BACKGROUND OF THE INVENTION

1. Field of the Invention

Example embodiments of the present invention are related generally to a system and method thereof, and more particularly to a system and method of operating the system.

2. Description of the Related Art

A conventional boot process may initialize a system and may read a portion of an operating system from an auxiliary memory. In addition, if the operating system is changed or not present within the auxiliary memory, the operating system may be installed or loaded into the auxiliary memory during the boot process. In portable information communication devices, a boot memory may be used for initially downloading a system program to an empty non-volatile memory (e.g., during a mass production of the non-volatile memory) or a non-volatile memory with an existing system program (e.g., to replace or update the existing system program).

FIG. 1 illustrates a conventional system. Referring to FIG. 1, the system may include a host 110 (e.g., a computer) which may communicate with an information communication device 150 through an interface 130, such as a universal serial bus (USB) or an advanced technology attachment (ATA)/attachment packet interface (ATAPI). The information communication device 150 may include a central processing unit (CPU) 151, a boot memory 152, a volatile memory 153 and a non-volatile memory 154.

Referring to FIG. 1, if no system program or an unsuitable system program is stored in the information communication device 150, a new system program may be loaded in the corresponding memory 152 and/or 154, as will now be described. A start program (e.g., a limited operating system or BIOS) may be stored in the boot memory 152 and/or the non-volatile memory 154 of the information communication device 150. A driver program for driving the non-volatile memory 154 may be stored in the boot memory 152. In an example, the non-volatile memory 154 may be a read only memory (ROM), a NAND-FLASH memory, a NOR-FLASH memory and/or any other well-known non-volatile memory device. Each type of non-volatile memory 154 may be associated with a different driver program (e.g., due to differences in structure and/or operation between different device types).

Referring to FIG. 1, the system program may be configured to facilitate a general operation of the information communication device 150, and may be downloaded from the host 110. For example, the system program may be downloaded from an Internet site or may alternatively be downloaded from a physical storage medium, such as a diskette, a compact disk (CD), a flash memory device, a DVD, etc., by the host 110. The CPU 151 of the information communication device 150 may execute the non-volatile memory driver program stored in the boot memory 152 and may store the received system program in the non-volatile memory 154 via the volatile memory 153. The path through which the system program may be stored in the non-volatile memory 154 may be denoted in FIG. 1 as a solid line.

Referring to FIG. 1, a process of modifying a pre-existing system program may be similar to the process of initially storing or loading a new system program "from scratch". The modification process may further include a deletion (e.g., over-writing, erasing, etc.) of the pre-existing system program. For example, the CPU 151 may store the new system program applied via the host 110, the interface 130, and the volatile memory 153 after deleting the stored system program.

Built-in non-volatile memory may increase a cost and complexity of the information communication device 150. However, if the non-volatile memory is detachable (e.g., capable of being removed and re-inserted and/or replaced), a market for "replacement" or upgraded non-volatile memory devices may increase.

As described above, in order to store the system program in the non-volatile memory 154, the non-volatile memory driver program may be stored in the boot memory 152. Therefore, if the non-volatile memory 154 is replaced with a replacement non-volatile memory, the non-volatile memory driver program, stored in the boot memory 152, may also be updated so as to ensure a proper operation with the replacement non-volatile memory, which may be an expensive and time-consuming process. For example, in the case of a mask type boot memory, a non-volatile memory driver program stored in the boot memory may be modified by updating the mask so as to store a new mask associated with the replacement non-volatile memory.

SUMMARY OF THE INVENTION

An example embodiment of the present invention is directed to a method of operating a system, including downloading first information, from a host device, associated with an operation of a non-volatile memory and downloading second information associated with an operation of the system including the non-volatile memory, the second information downloaded based on the operation of the non-volatile memory in accordance with the downloaded first information.

Another example embodiment of the present invention is directed to a system, including a host device configured to provide first information associated with an operation of a non-volatile memory and second information associated with an operation of the system, the system including the non-volatile memory, the second information downloaded based on the operation of the non-volatile memory in accordance with the downloaded first information.

Another example embodiment of the present invention is directed to a method of downloading a system program without modifying a boot program based on a type of a non-volatile memory.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

FIG. 1 illustrates a conventional system.

FIG. 2 illustrates a system according to an example embodiment of the present invention.

DETAILED DESCRIPTION OF EXAMPLE EMBODIMENTS OF THE PRESENT INVENTION

Figure 3:
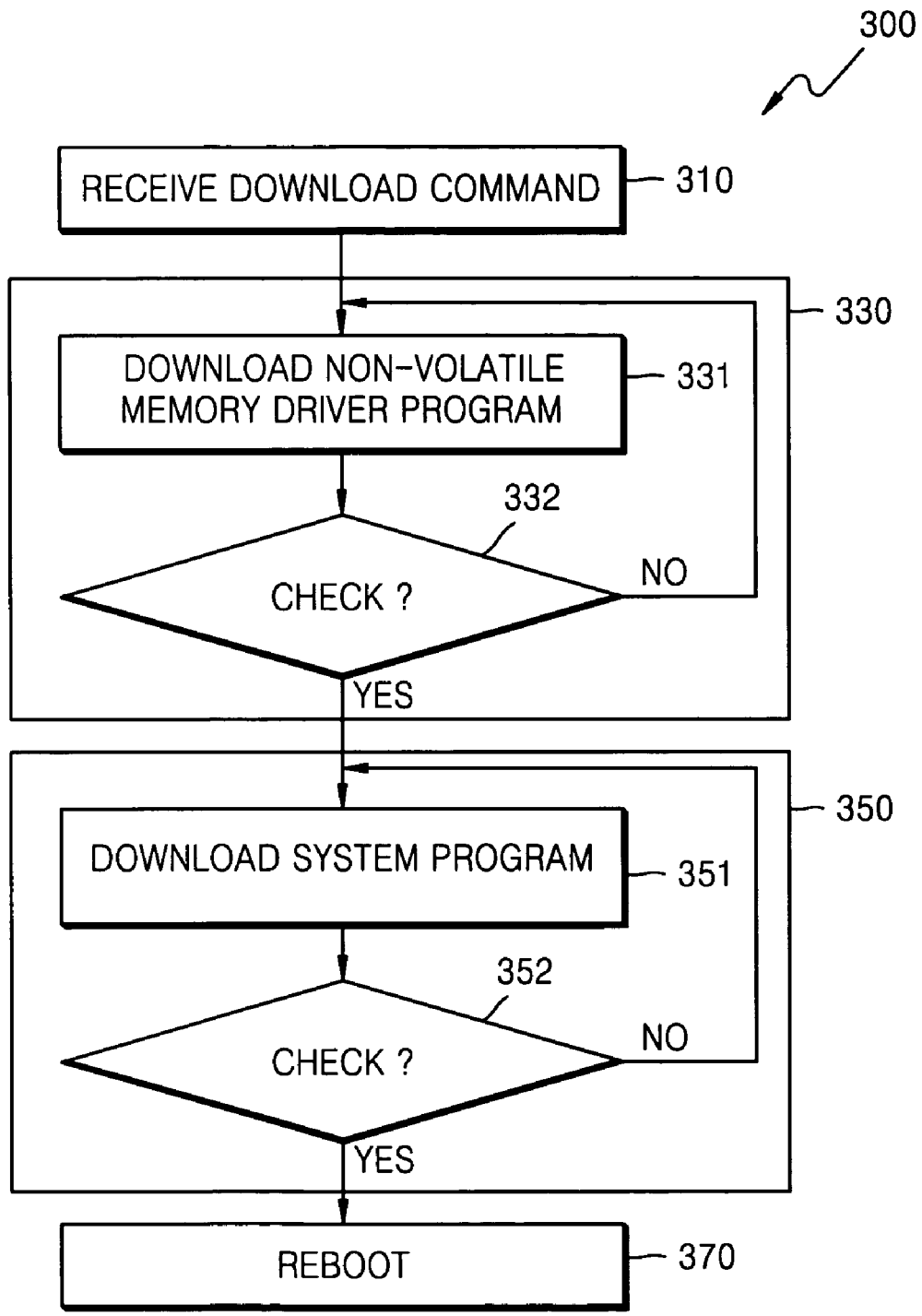
FIG. 3 illustrates a process of downloading a system program according to another example embodiment of the present invention.

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 2 illustrates a system according to an example embodiment of the present invention.

In the example embodiment of FIG. 2, the system may include two "download paths", with each download path referring to a series of connections through which information may be downloaded from a host 210 to an information communication device 250 via an interface 230. The information communication device 250 may include a central processing unit (CPU) 251, a boot memory 252, a volatile memory 253 and a non-volatile memory 254.

In the example embodiment of FIG. 2, a first path (e.g., denoted by a dotted line in FIG. 2) may be a path through which a non-volatile memory driver program may be downloaded or stored in the volatile memory 253 via the host 210. A second path (e.g., denoted by a solid line in FIG. 2) may be a path through which the system program may be downloaded or stored in the non-volatile memory 254 via the host 210 and the volatile memory 253.

In the example embodiment of FIG. 2, a memory driver program may be downloaded or stored into the volatile memory 253 through the first path. In an example, the CPU 251 may control the loading of the memory driver program into the volatile memory 253. The system program may be loaded into the non-volatile memory 254 through the second path, for example, controlled by an operation of the non-volatile memory driver program stored in the volatile memory 253. Thus, the CPU 251, which may control the volatile memory 253, may be said to "indirectly" control the loading of the system program into the non-volatile memory 254.

FIG. 3 illustrates a process 300 of downloading a system program according to another example embodiment of the present invention.

In the example embodiment of FIG. 3, a download command may be received (at 310). The download command may be a command for instructing the information communication device 250 to "initially" download the system program or, alternatively, to modify a pre-existing or stored system program. In an example, the download command may be generated by the host and/or the CPU 251.

In the example embodiment of FIG. 3, in response to the download command (from 310), a first downloading operation may be performed (at 330). The first downloading operation may include downloading the non-volatile memory driver program (at 331) (e.g., from the host 210) and checking or evaluating the downloaded non-volatile memory driver program (at 332). If the downloaded non-volatile memory driver program is determined to be inadequate (e.g., an error during the download process, an incompatibility with the non-volatile memory device stored in the information communication device, etc.), the download process may be repeated until an acceptable non-volatile memory driver program is acquired. Otherwise, if the downloaded non-volatile memory driver program is acceptable, the process 300 may perform a second downloading operation (at 350).

In the example embodiment of FIG. 3, the second downloading operation may include downloading the system program (at 351)(e.g., from the host 210) to the non-volatile memory based on the non-volatile memory driver program and checking or evaluating the downloaded system program (at 352). If the downloaded system program is determined to be inadequate (e.g., an error during the download process, an incompatibility with one or more components of the information communication device 250, etc.), the download process may be repeated until an acceptable system program is acquired. Otherwise, if the downloaded system program is acceptable, the process 300 may perform a reboot operation (at 370) to load and execute the system program to perform a general operation of the information communication device 250.

As discussed above in the Background of the Invention section, conventionally, the system program may be stored in a boot memory (e.g., boot memory 152 of FIG. 1), such that information stored in the boot memory may require an update whenever a non-volatile memory (e.g., non-volatile memory device 154 of FIG. 1) is replaced. In contrast, in an example embodiment of the present invention, the non-volatile memory driver program may be provided via the host 210 instead of the boot memory 252 such that the system program stored in the non-volatile memory may be adjusted dynamically (e.g., without requiring access to the boot memory) to accommodate for particular non-volatile memory devices based on the non-volatile memory driver program.

In another example embodiment of the present invention, semiconductor component manufacturers need not modify or replace boot memories in response to a mask change (e.g., a non-volatile memory device type change), thereby decreasing costs associated with information communication devices. Further, because a given boot memory may be used to boot a plurality of non-volatile memories, a development time of information communication devices, or components therein, may be reduced because a more "generic" boot memory may be deployed for a number of different configurations.

Example embodiments of the present invention being thus described, it will be obvious that the same may be varied in many ways. For example, while above-described example embodiments refer to the physical storage medium through which the driver programs are loaded into the host 210 of FIG. 2 as a CD, it will be readily appreciated that the physical storage medium may be any well-known physical storage medium in other example embodiments of the present invention, such as a DVD, an HD-DVD, a Blu-ray disc, etc. Alternatively, the physical storage medium may be embodied as an Ethernet card or other internet access card for accessing remote information.

Further, the information communication device 250 may be configured to conform with any well-known information communication device, including but not limited to an MP3 player, a navigation system for a car and/or a personal digital assistant (PDA).

Such variations are not to be regarded as a departure from the spirit and scope of example embodiments of the present invention, and all such modifications as would be obvious to one skilled in the art are intended to be included within the scope of the following claims.

What is claimed is:

1. A method for downloading a system program, comprising:
   downloading a non-volatile memory driver program to a volatile memory, from a host device, associated with an operation of a non-volatile memory, the downloading of the non-volatile memory driver program to the volatile memory being controlled by a central processing unit (CPU), the host device being a separate device from the CPU, the volatile memory, and the non-volatile memory; and
   downloading the system program associated with an operation of a system including the non-volatile memory from the host device, the system program being downloaded to the non-volatile memory based on the downloaded non-volatile memory driver program, the non-volatile memory being separate from the host device, wherein the non-volatile memory driver program is stored in a volatile memory, and
   wherein the system program is downloaded without modifying a boot program based on a type of the non-volatile memory.

2. The method of claim 1, wherein downloading the non-volatile memory driver program further includes:
   determining whether the downloaded non-volatile memory driver program is correct; and
   prompting an entity sending the downloaded non-volatile memory driver program to resend the downloaded non-volatile memory driver program if the determining step determines that the downloaded non-volatile memory driver program is not correct.

3. The method of claim 2, further comprising:
   repeating the determining and prompting steps until one of the repeated determining steps determines that the downloaded non-volatile memory driver program is correct.

4. The method of claim 1, wherein the volatile memory is included within the system along with the non-volatile memory.

5. The method of claim 1, downloading the system program further includes:
   determining whether the downloaded system program is correct; and
   prompting an entity sending the downloaded system program to resend the downloaded system program if the determining step determines that the downloaded system program is not correct.

6. The method of claim 5, further comprising:
   repeating the determining and prompting steps until one of the repeated determining steps determines that the downloaded system program is correct.

7. The method of claim 1, wherein the host device receives the downloaded non-volatile memory driver program via a physical storage medium.

8. The method of claim 7, wherein the physical storage medium is one of a diskette, a CD, a DVD, a Blu-ray disc, an HD-DVD and an internet access device.

9. The method of claim 1, further comprising:
   receiving a download command including instructions for downloading the system program.

10. The method of claim 9, wherein the download command is one of (i) a command for downloading an initial system program and (ii) a command for modifying a previously stored system program.

11. The method of claim 9, wherein the download command is generated by one of the host device and the(CPU), each of the host and the CPU included within the system.

12. The method of claim 1, further comprising:
   rebooting the system in accordance with the downloaded system program.

13. The method of claim 1, wherein the system includes an information communication device performing data communication with a host through one of a wired interface and a wireless interface.

14. The method of claim 13, wherein the interface includes at least one of a universal serial bus (USB) interface and an advanced technology attachment (ATA)/attachment packet interface (ATAPI).

15. The method of claim 13, wherein the information communication device includes at least one of an MP3 player, a navigation system for a car, and a personal digital assistant (PDA).

16. The method of claim 1, wherein the non-volatile memory driver program is downloaded to the volatile memory from the host,
   downloading the non volatile memory driver program to the volatile memory takes place before downloading the system program to the non volatile memory, and downloading the system program includes using the non-volatile memory driver program stored in the volatile memory to control the non volatile memory to load the system program.

17. A system for downloading a system program, comprising:

a host device configured to provide a non-volatile memory driver program associated with an operation of a non-volatile memory and the system program associated with an operation of the system, the system including a central processing unit (CPU), a volatile memory, and the non-volatile memory, the CPU controlling downloading of the non-volatile memory driver program to the volatile memory, the host device being a separate device from the CPU, the volatile memory and the non-volatile memory, the system program being downloaded to the non-volatile memory from the host device based on the downloaded non-volatile memory driver program, the non-volatile memory being separate from the host device, wherein the non-volatile memory driver program is stored in a volatile memory, and wherein the system program is downloaded without modifying a boot program based on a type of the non-volatile memory.

18. The system of claim 17, further comprising:
a boot memory, the boot memory not including the non-volatile memory driver program.

19. The system of claim 17, further comprising:
a volatile memory configured to receive and store the non-volatile memory driver program.

20. The method of claim 17, wherein the volatile memory is configured to download the non-volatile memory driver program from the host, the system is configured such that downloading the non volatile memory driver program to the volatile memory takes place before downloading the system program to the non volatile memory, and the nonvolatile memory driver program stored in the volatile memory is configured to control the non volatile memory to load the system program.

21. A method of operating the system of claim 17.

* * * * *